(12) United States Patent
Bower, III et al.

(10) Patent No.: US 11,720,431 B1
(45) Date of Patent: Aug. 8, 2023

(54) IDENTIFYING AND REPORTING BASEBOARD MANAGEMENT CONTROLLER PERFORMANCE DEGRADATION

(71) Applicant: Lenovo Global Technology (United States) Inc., Morrisville, NC (US)

(72) Inventors: Fred Allison Bower, III, Durham, NC (US); Caihong Zhang, Shanghai (CN); Ming Lei, Shanghai (CN)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 4 days.

(21) Appl. No.: 17/706,315

(22) Filed: Mar. 28, 2022

(51) Int. Cl.
*G06F 11/00* (2006.01)
*G06F 11/07* (2006.01)

(52) U.S. Cl.
CPC ...... *G06F 11/0754* (2013.01); *G06F 11/0709* (2013.01)

(58) Field of Classification Search
CPC ............. G06F 11/0775; G06F 11/0766; G06F 11/0754; G06F 11/3409; G06F 11/3466; G06F 11/3476; G06F 11/004
See application file for complete search history.

(56) References Cited

U.S. PATENT DOCUMENTS

| 2016/0261455 A1* | 9/2016 | Su ........................ H04L 41/069 |
| 2022/0206485 A1* | 6/2022 | Qadri .................. G06F 11/0778 |
| 2023/0118160 A1* | 4/2023 | Poornachandran ........................ G06F 11/0793 714/3 |

* cited by examiner

*Primary Examiner* — Marc Duncan
(74) *Attorney, Agent, or Firm* — Jeffrey L. Streets; Streets Lawfirm, PC

(57) ABSTRACT

A computer program product and computer-implemented method include various operations. The operations include periodically obtaining a subset of a first failure data capture file from a baseboard management controller, analyzing the subset of the first failure data capture file to identify a performance degradation in one or more services performed by the baseboard management controller, and obtaining a complete copy of the first failure data capture file from the baseboard management controller in response to identifying the performance degradation, wherein the complete copy of the first failure data capture file is obtained from the baseboard management controller prior to the performance degradation reaching a performance level that triggers an automatic reset of the baseboard management controller. The operations may further include sending a notification to a user, wherein the notification identifies that the baseboard management controller has experienced the performance degradation.

20 Claims, 4 Drawing Sheets

IDENTIFYING AND REPORTING BASEBOARD MANAGEMENT CONTROLLER PERFORMANCE DEGRADATION

BACKGROUND

The present disclosure relates to operation and management of a baseboard management controller in a compute node or server.

BACKGROUND OF THE RELATED ART

It is common for modern data center equipment, such as servers, to contain an embedded system that is responsible for monitoring environmental and operational aspects of the equipment. In a server, this subsystem is called a service processor (SP) or baseboard management controller (BMC). As a result of the nearly-always-on nature of these subsystems, it is common that small resource leaks may accumulate over an extended period of time, slowly degrading the performance of the subsystem. A code defect, such as a deadlock in one service of the service processor, may also cause the service to have a slow response time. Either of these problems may eventually cause the baseboard management controller to hang.

Even if the baseboard management controller operation degrades over time or hangs, the baseboard management controller typically does not get reset unless there is a full power loss to the power supplies that provide power to the server. Alternatively, a software failure could result in a watch dog process triggering an automatic reset of the baseboard management controller or system administrator personnel may manually reset the baseboard management controller.

BRIEF SUMMARY

Some embodiments provide a computer program product comprising a non-volatile computer readable medium and non-transitory program instructions embodied therein, where the program instructions are configured to be executable by a processor to cause the processor to perform various operations. The operations comprise periodically obtaining a subset of a first failure data capture file from a baseboard management controller, analyzing the subset of the first failure data capture file to identify a performance degradation in one or more services performed by the baseboard management controller, and obtaining a complete copy of the first failure data capture file from the baseboard management controller in response to identifying the performance degradation, wherein the complete copy of the first failure data capture file is obtained from the baseboard management controller prior to the performance degradation reaching a performance level that triggers an automatic reset of the baseboard management controller. The operations may further comprise sending a notification to a user, wherein the notification identifies that the baseboard management controller has experienced the performance degradation.

Some embodiments provide a computer-implemented method including various operations. The operations comprise periodically obtaining a subset of a first failure data capture file from a baseboard management controller, analyzing the subset of the first failure data capture file to identify a performance degradation in one or more services performed by the baseboard management controller, and obtaining a complete copy of the first failure data capture file from the baseboard management controller in response to identifying the performance degradation, wherein the complete copy of the first failure data capture file is obtained from the baseboard management controller prior to the performance degradation reaching a performance level that triggers an automatic reset of the baseboard management controller. The operations may further comprise sending a notification to a user, wherein the notification identifies that the baseboard management controller has experienced the performance degradation.

DETAILED DESCRIPTION

Figure 1:
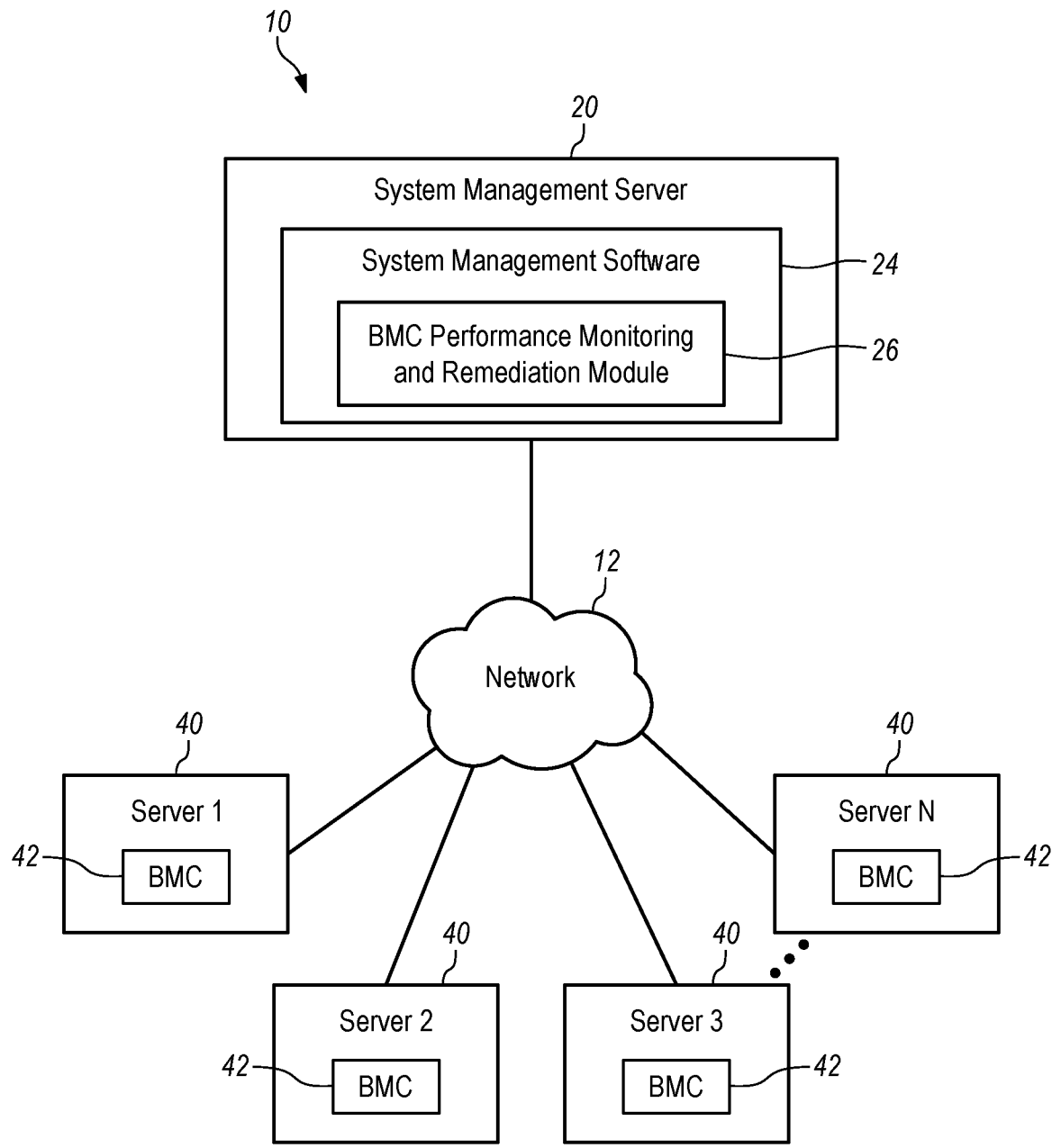
FIG. 1 is a diagram of a system including a system management server and multiple compute nodes or servers.

Some embodiments provide a computer program product comprising a non-volatile computer readable medium and non-transitory program instructions embodied therein, where the program instructions are configured to be executable by a processor to cause the processor to perform various operations. The operations comprise periodically obtaining a subset of a first failure data capture file from a baseboard management controller, analyzing the subset of the first failure data capture file to identify a performance degradation in one or more services performed by the baseboard management controller, and obtaining a complete copy of the first failure data capture file from the baseboard management controller in response to identifying the performance degradation, wherein the complete copy of the first failure data capture file is obtained from the baseboard management controller prior to the performance degradation reaching a performance level that triggers an automatic reset of the baseboard management controller. The operations may further comprise sending a notification to a user, wherein the notification identifies that the baseboard management controller has experienced the performance degradation.

In some embodiments, the computer program product may be a module of a system management software program that is executed by a central processing unit (CPU) that is a component of a system management node or server. For example, in a data center having a plurality of compute nodes or servers, a system management server may be in communication with the baseboard management controllers of each of the compute nodes or servers over a local area network. Accordingly, a system management software program being executed by the system management server may cause the system management server to perform the operations of the computer program product or the computer-implemented method.

First Failure Data Capture (FFDC) involves the collect of information about events and conditions that may lead to a failure of a component or system so that there is no need to re-create the failure. An FFDC file includes data documenting the events and conditions that the component or system experienced immediately prior to (leading up to) a failure. In the present embodiments, the component that is the subject of the FFDC file may be the baseboard management controller or similar service processor responsible for managing an interface between system management software and the hardware of the individual compute node or server. A baseboard management controller (BMC) is a microcontroller that is typically embedded on the motherboard of a computer, such as a server. Among other functions, the baseboard management controller typically monitors the hardware of a compute node and may send alerts to the system management software. Furthermore, the baseboard management controller may carry out instructions received from the system management software, such as an instruction to reset or power cycle the compute node or a request to report events or conditions of the hardware components on the compute node. The baseboard management controller may provide the intelligence in the Intelligent Platform Management Infrastructure (IPMI) architecture.

The data in an FFDC file may be collected prospectively since it may be impossible to collect important data about the events and conditions that led up to failure of a component or system after (subsequently to) the failure of the component or system. Accordingly, the data in a FFDC file may be periodically or continuously collected and stored, such as in a last-in, first-out manner so that the data most recent in time is contained in the FFDC file. The data included in a full FFDC file may vary over time to reflect actual events and conditions that have occurred recently for a particular component or system. Furthermore, the contents of a full FFDC file may vary from one component or system to another, and the types of events or conditions collected in the FFDC file may be preselected by a system administrator. Non-limiting examples of data in a FFDC file may include configuration information, runtime statistics, message logs, and memory dumps. Runtime statistics may include, for example, various performance metrics and/or memory metrics for the component or system.

The subset of the first failure data capture file that is periodically obtained from the baseboard management controller may include any portion of the FFDC file. In one option, the subset of the FFDC file is the most recent data across all events and conditions of the baseboard management controller. In another option, the subset of the FFDC file includes runtime statistics that describe the overall performance of the baseboard management controller, such as a performance metric or a responsiveness parameter. One example of a responsiveness parameter is an amount time between the baseboard management controller receiving a request to perform a service and providing a response to the request. In yet another option, the subset of the FFDC file may include any one or more events or conditions of the baseboard management controller pre- selected by a system administrator as events or conditions to be included in the subset of the FFDC file (i.e., the "mini FFDC"). Furthermore, the subset of the FFDC may include any one or more event or condition, such as a load on the BMC ("BMC load"), a load on the central processing unit (CPU) ("CPU load"), memory metrics for one or more services provided by the BMC, and/or a request and response time for one or more individual service provided by the BMC. The baseboard management controller may provide various services, such as redfish service, web service, and/or IPMI service. Although the duration of a time period between periodic subsets of FFDC data captures may be any selected duration, the subset of FFDC data may be captured every few hours, such as every 12 hours. Still further, the time period between periodic collection of a subset of FFDC data may be dynamically changed in response to a selected event or condition affecting the baseboard management controller.

A complete copy of the first failure data capture file may be request and obtained from the baseboard management controller in response to identifying the performance degradation. In other words, performance degradation in the operation of the baseboard management controller is being used as a predictor that the baseboard management controller or some one or more services of the baseboard management controller may be soon experiencing a hang or stalled condition. For example, if the memory used by the baseboard management controller is experiencing a memory leak, the memory leak is likely to get worse rather than clear up on its own. So, rather than waiting for the baseboard management controller performance to drop so low as to trigger an automatic reset, embodiments of the system management software collect a full FFDC file from the baseboard management controller in response to identifying the existence of the performance degradation. Once the BMC full FFDC file is received by the system management, the BMC full FFDC file is safe from being lost. In particular, the BMC full FFDC file is protected against the loss of data that might otherwise occur if the BMC were to be automatically reset, since a BMC reset will immediately clear the BMC data.

In some embodiments, the subset of the first failure data capture file and/or the complete copy of the first failure data capture file may obtained by the system management software in response to sending a request to the baseboard management controller. In other embodiments, the subset of the first failure data capture file and/or the complete copy of the first failure data capture file may be obtained by the system management software as a result of the baseboard management controller pushing the data to the system management software. In one option, the baseboard management controller could send the subset of the first failure data capture file to the system management software on a predetermined schedule or at predetermined intervals, whereas the system management software could send a request for the complete copy of the first failure data capture file to the baseboard management controller in response to identifying performance degradation of the baseboard management controller.

In some embodiments, performance degradation of the baseboard management controller may be identified in various ways. In one example, the subset of the first failure data capture file may include a load on the baseboard management controller, such that the performance degradation may be identified in response to the baseboard management controller performing below a predetermined level of performance. For example, the predetermined level of performance may be a processor utilization level for the baseboard management controller. Optionally, the notification sent to the user may identify the performance level of the baseboard management controller.

In another example, the subset of the first failure data capture file may include a response time for one or more services provided by the baseboard management controller to respond to a request, such that the performance degradation may be identified in response to the response time being greater than a predetermined response time threshold. In order to obtain the complete copy of the first failure data capture file before the baseboard management controller is automatically reset and a part of the first failure data capture file may become lost or overridden, the predetermined response time threshold is preferably less than a second response time threshold that triggers an automatic reset of the baseboard management controller. Optionally, the notification sent to the user may identify a value of the baseboard management controller response time and a service that was experiencing the baseboard management controller response time. In one implementation, the performance degradation in the baseboard management controller may be identified as a low level of responsiveness to a request from the CPU of the compute node or other entity relying upon the BMC, or perhaps even a request from the system management software itself If the BMC responds to a request in a response time (i.e., duration of time between the request and the subsequent response to the request) greater than a response time threshold, then the BMC performance may be identified as being in a degraded or unresponsive state.

In yet another example, the subset of the first failure data capture file may include memory metrics for one or more services provided by the baseboard management controller, such that the performance degradation may be identified in response to an available amount of memory of the baseboard management controller being less than a predetermined minimum or threshold amount of memory. In a further example, the memory metrics may include a memory utilization level, such that performance degradation may be identified in response to a memory utilization level that is less than a predetermined minimum or threshold level of memory utilization. Optionally, the notification sent to the user may identify the available amount of memory of the baseboard management controller or the memory utilization level. Any of the foregoing examples may be combined, such that the occurrence of any one of the example conditions may result in a performance degradation being identified. One of the foregoing example conditions may be better at identifying a memory leak and another of the example conditions may be better at identifying a hang of a service provided by the baseboard management controller.

In some embodiments, the system management software may use an artificial intelligence (AI) analytics module using an AI algorithm, such as a long short-term memory (LSTM) algorithm, to analyze the subset of the FFDC file and identify whether the BMC performance has degraded. Accordingly, any type of anomaly in one or more events or conditions of the baseboard management controller may be used to identify performance degradation.

In some embodiments, the user may be provided with access to the complete copy of the first failure data capture file obtained from the baseboard management controller. Upon receipt of a notification and the provision of access to the complete FFDC file, the user is enabled to diagnose a condition that is causing the BMC performance degradation. Preferably, the user will then take an action to fix the condition that is causing the BMC performance degradation.

Some embodiments provide a computer-implemented method including various operations. The operations comprise periodically obtaining a subset of a first failure data capture file from a baseboard management controller, analyzing the subset of the first failure data capture file to identify a performance degradation in one or more services performed by the baseboard management controller, and obtaining a complete copy of the first failure data capture file from the baseboard management controller in response to identifying the performance degradation, wherein the complete copy of the first failure data capture file is obtained from the baseboard management controller prior to the performance degradation reaching a performance level that triggers an automatic reset of the baseboard management controller. The operations may further comprise sending a notification to a user, wherein the notification identifies that the baseboard management controller has experienced the performance degradation. Embodiments of the computer-implemented method may further include any one or more of the operations described herein in reference to the computer program product embodiments.

Some embodiments provide the technical benefit of reducing or eliminating slow or gradual performance degradation in the baseboard management controller or similar embedded service processor of data center equipment, such as a server. Another technical benefit is that a complete FFDC file is obtained in response to events or conditions that show performance degradation without yet causing an automatic reset and the possible corresponding loss of the FFDC file.

FIG. 1 is a diagram of a system 10 including a system management server 20 and multiple compute nodes or servers 40. The system management server 20 is able to communicate with a baseboard management controller 42 of each server 40 over a network 12. The system management server 20 includes program instruction that control communications with the baseboard management controllers 42, such as a BMC performance monitoring and remediation module 26. Optionally, the BMC performance monitoring and remediation module 26 or similar program instructions may be included as a module of a system management software program 24.

Figure 2:
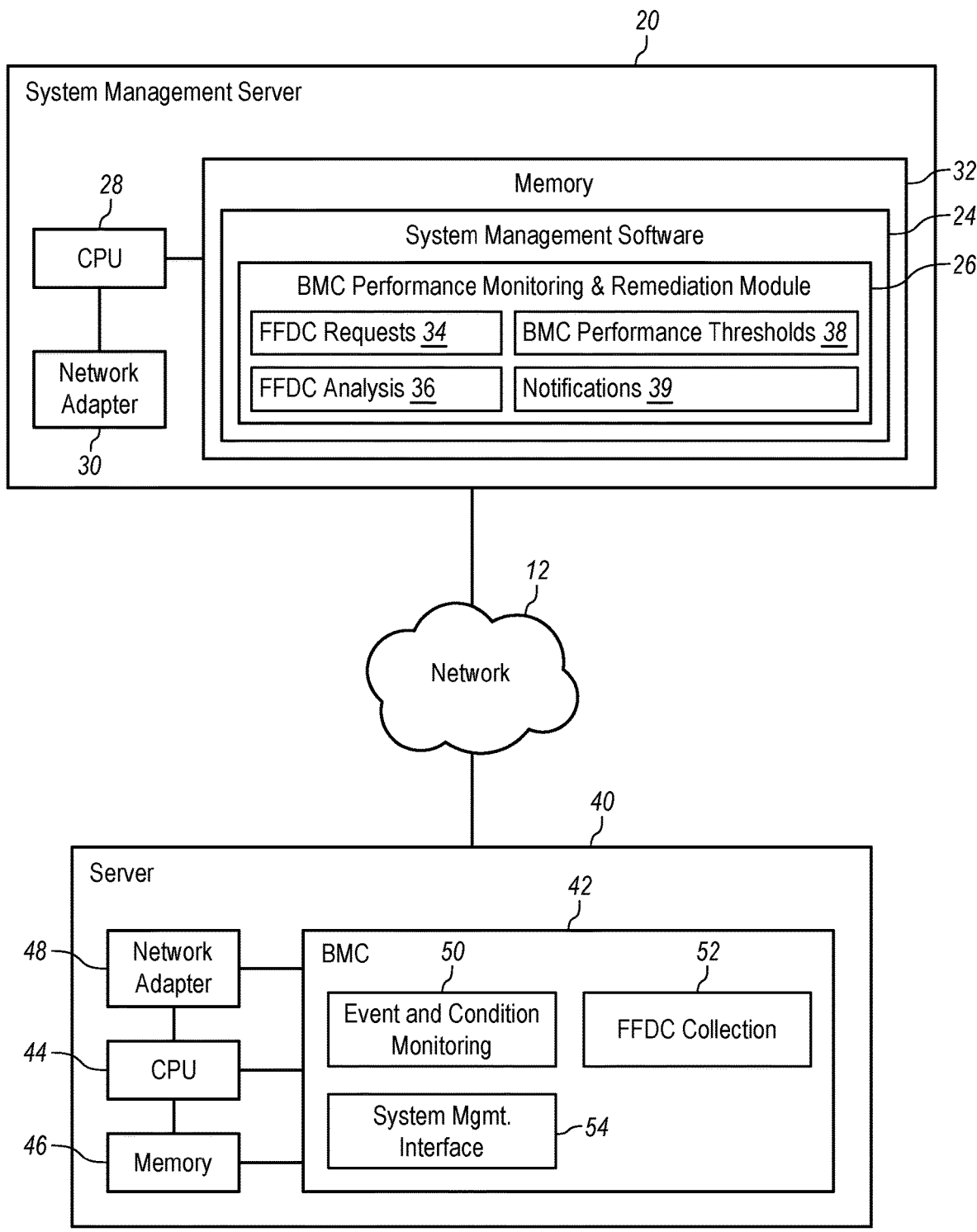
FIG. 2 is a diagram of the system management server in communication with a baseboard management controller of one of the compute nodes or servers.

FIG. 2 is a diagram of the system management server 20 in communication with a baseboard management controller 42 of one of the compute nodes or servers 40. The compute node or server 40 includes a central processing unit (CPU) 44, memory 46 and a network adapter 48. The baseboard management controller 42 monitors operation of the hardware components 44, 46, 48 in the server 40 and may also use the network adapter 48 to support communication between the baseboard management controller 42 and the system management controller 20. The baseboard management controller 42 may run various software or firmware modules, but some embodiments may include an event and condition monitoring module 50, an FFDC file collection module 52, and a system management interface 54. The event and condition monitoring module 50 may include program instructions that cause the baseboard management controller 42 (a microcontroller) to perform monitoring of various events and conditions of the baseboard management controller or affecting the performance of the baseboard management controller. The FFDC file collection module 52 may cause the baseboard management controller to collect some or all of the events and conditions data in a FFDC file to be used troubleshooting a hang or performance degradation of the baseboard management controller. The system management interface 54 may cause the baseboard management controller to communicate with the system management server 20 according to one or more of the described embodiments, such as responding to periodic requests for a subset of the FFDC file and responding to requests for a complete (full) copy of the FFDC file.

The system management server 20 includes a central processing unit (CPU) 28, a network adapter 30, and memory 32. The system management server 20 monitors operation of the baseboard management controller 42 of the compute node or server 40 and may use the network adapter 30 to support communication with the baseboard management controller 42 over the network 12. The system management server 20 may run various software or firmware modules, but some embodiments may include the system management software 24 including the BMC performance monitoring and remediation module 26. Furthermore, embodiments of the BMC performance monitoring and remediation module 26 may include an FFDC requests module 34, an FFDC analysis module 36, BMC performance thresholds 38, and a user notifications module 39. The FFDC requests module 34 may include program instructions that cause the CPU 28 to periodically request and obtain a subset of a first failure data capture file from the baseboard management controller 42, as well as request and obtain a complete copy of the first failure data capture file from the baseboard management controller in response to identifying the performance degradation. The FFDC analysis module 36 may include program instructions that cause the CPU 28 to analyze the subset of the first failure data capture file to identify a performance degradation in one or more services performed by the baseboard management controller. The BMC performance thresholds 38 may include one or more performance thresholds, such as response time, available memory, or BMC load, which thresholds are used by the analysis module 36 to identify BMC performance degradation and determine when to request a full FFDC file. The performance thresholds are preferably set at a level to identify performance degradation before the BMC performance reaches a performance level that would trigger an automatic reset of the baseboard management controller. The user notifications module 39 may include program instructions that cause the CPU 28 to send a notification to a user, wherein the notification identifies that the baseboard management controller has experienced the performance degradation.

Figure 3:
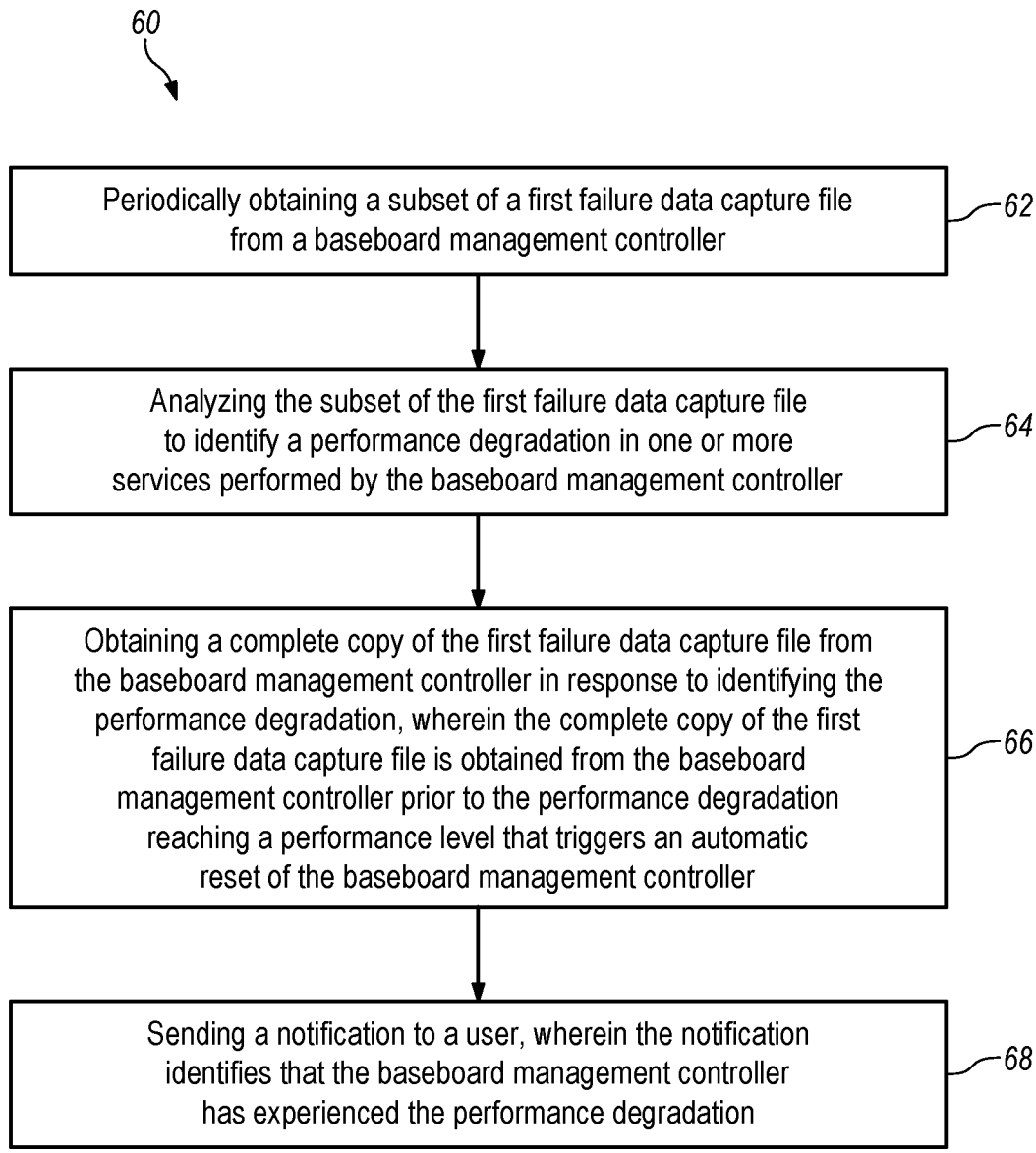
FIG. 3 is a flowchart of operations according to a computer program product or computer-implemented method.

FIG. 3 is a flowchart of operations 60 according to a computer program product or computer-implemented method. Operation 62 includes periodically obtaining a subset of a first failure data capture file from a baseboard management controller. Operation 64 includes analyzing the subset of the first failure data capture file to identify a performance degradation in one or more services performed by the baseboard management controller. Operation 66 includes obtaining a complete copy of the first failure data capture file from the baseboard management controller in response to identifying the performance degradation, wherein the complete copy of the first failure data capture file is obtained from the baseboard management controller prior to the performance degradation reaching a performance level that triggers an automatic reset of the baseboard management controller. Operation 68 includes sending a notification to a user, wherein the notification identifies that the baseboard management controller has experienced the performance degradation.

Figure 4:
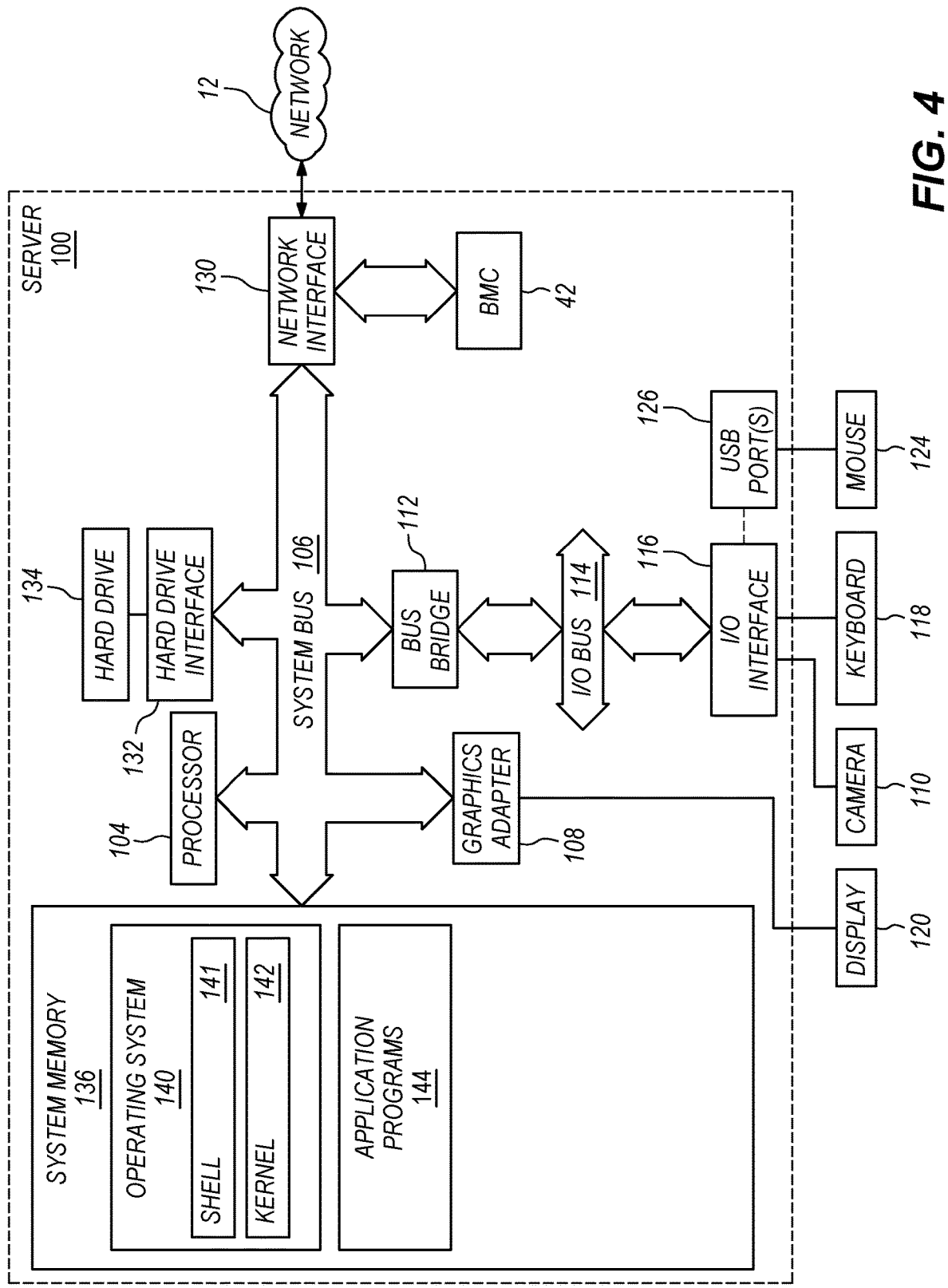
FIG. 4 is a diagram of a server.

FIG. 4 is a diagram of one embodiment of a server 100 that may be included in the system 10 of FIG. 1. The server may be representative of a system management server 20 or any of the compute nodes or servers 40 having a baseboard management controller 42. The server 100 includes a processor unit 104 that is coupled to a system bus 106. The processor unit 104 may utilize one or more processors, each of which has one or more processor cores. An optional graphics adapter 108, which may drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over the network 12 using a network adapter or network interface controller 130. For example, the computer 100 may be a system management server and communicate with a remote server that stores a firmware repository as well as with the managed servers or other nodes in the test system and the production system.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the computer 100 are not intended to be exhaustive, but rather are representative.

The operating system 114 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer 100 may include application programs 144 stored in the system memory 136. For example, where the computer 100 is a system management server 20, the system memory may include a system management software program 24 including the BMC performance monitoring and remediation module 26 (See FIGS. 1 and 2).

Still further, the server 100 may include a service processor, such as the baseboard management controller (BMC) 42. The BMC is considered to be an out-of-band controller and may monitor and control various components of the server. However, the BMC may communicate with the system management server via the network interface 130 and network 12, such as communicating the occurrence of node malfunctions, receiving firmware updates for one or more component of the server, and providing subset and complete FFDC file data regarding the performance of the BMC itself As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

periodically obtaining a subset of a first failure data capture file from a baseboard management controller;

analyzing the subset of the first failure data capture file to identify a performance degradation in one or more services performed by the baseboard management controller;

obtaining a complete copy of the first failure data capture file from the baseboard management controller in response to identifying the performance degradation, wherein the complete copy of the first failure data capture file is obtained from the baseboard management controller prior to the performance degradation reaching a performance level that triggers an automatic reset of the baseboard management controller; and sending a notification to a user, wherein the notification identifies that the baseboard management controller has experienced the performance degradation.

2. The computer program product of claim 1, wherein the subset of the first failure data capture file includes a load on the baseboard management controller.

3. The computer program product of claim 2, wherein the performance degradation is identified in response to the baseboard management controller performing below a predetermined level of performance.

4. The computer program product of claim 3, wherein the notification sent to the user identifies the performance level of the baseboard management controller.

5. The computer program product of claim 1, wherein the subset of the first failure data capture file includes a response time for one or more services provided by the baseboard management controller to respond to a request.

6. The computer program product of claim 5, wherein the performance degradation is identified in response to the response time being greater than a predetermined response time threshold.

7. The computer program product of claim 6, wherein the predetermined response time threshold is less than a second response time threshold that triggers an automatic reset of the baseboard management controller.

8. The computer program product of claim 7, wherein the notification sent to the user identifies a value of the baseboard management controller response time and a service that was experiencing the baseboard management controller response time.

9. The computer program product of claim 1, wherein the subset of the first failure data capture file includes memory metrics for one or more services provided by the baseboard management controller.

10. The computer program product of claim 9, wherein the performance degradation is identified in response to an available amount of memory of the baseboard management controller being less than a predetermined minimum amount of memory.

11. The computer program product of claim 10, wherein the notification sent to the user identifies the available amount of memory of the baseboard management controller.

12. The computer program product of claim 1, wherein the performance degradation is a memory leak or a hang of a service provided by the baseboard management controller.

13. The computer program product of claim 1, the operations further comprising:

providing the user with access to the complete copy of the first failure data capture file obtained from the baseboard management controller.

14. The computer program product of claim 1, wherein the operation of periodically obtaining a subset of a first failure data capture file from a baseboard management controller includes periodically sending a request for the subset of the first failure data capture file to the baseboard management controller.

15. The computer program product of claim 1, wherein the operation of obtaining a complete copy of the first failure data capture file from the baseboard management controller includes sending a request for the complete copy of the first failure data capture file to the baseboard management controller.

16. A computer-implemented method, comprising:

periodically obtaining a subset of a first failure data capture file from a baseboard management controller;

analyzing the subset of the first failure data capture file to identify a performance degradation in one or more services performed by the baseboard management controller;

obtaining a complete copy of the first failure data capture file from the baseboard management controller in response to identifying the performance degradation, wherein the complete copy of the first failure data capture file is obtained from the baseboard management controller prior to the performance degradation reaching a performance level that triggers an automatic reset of the baseboard management controller; and sending a notification to a user, wherein the notification identifies that the baseboard management controller has experienced the performance degradation.

17. The computer-implemented method of claim 16, wherein the subset of the first failure data capture file includes a performance level of the baseboard management controller, and wherein the performance degradation is identified in response to the baseboard management controller performing below a predetermined level of performance.

18. The computer-implemented method of claim 16, wherein the subset of the first failure data capture file includes a response time for one or more services provided by the baseboard management controller to respond to a request, wherein the performance degradation is identified in response to the response time being greater than a predetermined response time threshold, and wherein the predetermined response time threshold is less than a second response time threshold that triggers an automatic reset of the baseboard management controller.

19. The computer-implemented method of claim 16, wherein the subset of the first failure data capture file includes memory metrics for one or more services provided by the baseboard management controller, and wherein the performance degradation is identified in response to an available amount of memory of the baseboard management controller being less than a predetermined minimum amount of memory.

20. The computer-implemented method of claim 16, wherein the operation of periodically obtaining a subset of a first failure data capture file from a baseboard management controller includes periodically sending a request for the subset of the first failure data capture file to the baseboard management controller, and wherein the operation of obtaining a complete copy of the first failure data capture file from the baseboard management controller includes sending a request for the complete copy of the first failure data capture file to the baseboard management controller.

* * * * *